(12) United States Patent
Han et al.

(10) Patent No.: US 7,586,872 B2
(45) Date of Patent: Sep. 8, 2009

(54) USER ASSIGNMENT STRATEGIES FOR HIERARCHICAL AND OTHER OVERLAY NETWORKS

(75) Inventors: Seung-Jae Han, Basking Ridge, NJ (US); Thierry E. Klein, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1246 days.

(21) Appl. No.: 10/411,844

(22) Filed: Apr. 11, 2003

(65) Prior Publication Data
US 2004/0202135 A1 Oct. 14, 2004

(51) Int. Cl.
*H04W 4/00* (2006.01)
(52) U.S. Cl. .............. 370/329; 370/338; 455/441; 455/450; 455/451; 455/452; 455/453
(58) Field of Classification Search .............. None
See application file for complete search history.

(56) References Cited

U.S. PATENT DOCUMENTS

| | | | | |
|---|---|---|---|---|
| 5,572,221 A * | 11/1996 | Marlevi et al. | .............. | 342/452 |
| 5,787,348 A | 7/1998 | Willey et al. | ................ | 455/441 |
| 5,802,105 A * | 9/1998 | Tiedemann et al. | ......... | 375/225 |
| 5,963,870 A * | 10/1999 | Chheda et al. | .............. | 455/522 |
| 6,212,389 B1 | 4/2001 | Fapojuwo | ................... | 455/453 |
| 6,381,461 B1 * | 4/2002 | Besson et al. | ............... | 455/450 |
| 6,421,538 B1 * | 7/2002 | Byrne | ......................... | 455/441 |
| 6,484,030 B1 * | 11/2002 | Antoine et al. | .............. | 455/444 |
| 6,771,964 B1 * | 8/2004 | Einola et al. | ................ | 455/437 |
| 6,996,400 B2 * | 2/2006 | Posti et al. | .................... | 455/450 |
| 2003/0148765 A1 | 8/2003 | Ma et al. | ..................... | 455/438 |

OTHER PUBLICATIONS

Kim et al., "Determining Velocity Threshold For Handoff Control in Hierarchically Structured Networks", IEEE 1998, pp. 350-354.*
Yeung et al., "Channel Management in Microcell/Macrocell Cellular Radio Systems", IEEE 1996, pp. 612.*

* cited by examiner

*Primary Examiner*—Jayanti K Patel
*Assistant Examiner*—Jung Park (57) ABSTRACT

A hierarchical assignment manager (HAM) improves system throughput in a hierarchical overlay network by taking into account the requested data rates in addition to or instead of the velocities of mobile users within the network. The user population is characterized by the statistical description of their user profiles. The entire set of profiles is partitioned along assignment curves into two or more subsets, where each subset corresponds to the assignment to a particular layer of a hierarchical network. The HAM determines assignment curves to optimize the total effective system throughput in a systematic way and can be adapted to time-varying user behavior and profiles. The HAM can be used to decide upon assignment strategies between different layers of an overlay architecture, between different available network technologies, or between competing service providers.

31 Claims, 7 Drawing Sheets

USER ASSIGNMENT STRATEGIES FOR HIERARCHICAL AND OTHER OVERLAY NETWORKS

BACKGROUND OF THE INVENTION

1. Field of the Invention

The present invention relates to communications networks, and more specifically, to user assignment strategies within hierarchical voice-and-data overlay networks.

2. Description of the Related Art

Some of the major challenges facing next-generation, wireless networks lay in efficient resource allocation and mobility management strategies that can accommodate a large number of high-data-rate users. Hierarchical or multi-tier network architectures (e.g., two-tier micro-cell/macro-cell architectures) have recently been proposed for these applications.

Assignment strategies for such hierarchical networks have heretofore been tailored towards voice users and circuit-switched services, with the objective of reducing the probability of service blocking or call dropping. These assignment strategies have focused on the velocities of mobile users relative to the center of a micro-cell or macro-cell, and micro-cell and macro-cell traversal times relative to handoff and switching times. Such assignment strategies are appropriate for voice users, who have fixed throughput rates and bounded data-delay requirements, and whose call arrival and call length processes conform to particular statistical models.

However, data users, while in some cases requiring more aggregate bandwidth than voice users, are generally more flexible with respect to delay and minimum continuous data rate requirements, and their usage patterns exhibit different statistical distributions than voice users. Assignment strategies that are appropriate for voice users may be inefficient and/or inadequate for next generation wireless networks that support both voice and data users.

SUMMARY OF THE INVENTION

Problems in the prior art are addressed in accordance with principles of the invention by an apparatus and method for achieving improved system throughput in overlay networks, such as hierarchical overlay networks, that take into account the requested data rates or both the velocities and the requested data rates of users within the network. A user population is characterized by the statistical description of the user profiles of the constituents of the population. The entire set of profiles is partitioned along assignment curves into two or more subsets. Each subset corresponds to an assignment to a particular layer of a hierarchical network. Assignment curves are determined to maximize the total effective system throughput in a systematic way and can be adapted to time-varying user behavior and profiles. The method can be used to decide upon assignment strategies between different layers of the overlay architecture, between different available network technologies, and/or between competing service providers.

In one embodiment, the invention is a method for assigning users in an overlay network having two or more layers. The method includes (a) receiving a request from a user for assignment within the network, where the request identifies a desired data transmission parameter for the user's assignment; and (b) selecting a layer of the network for the user's assignment based on the desired data transmission parameter.

In another embodiment, the invention is an assignment manager for assigning users in an overlay network having two or more layers. The assignment manager is adapted to (a) receive a request from a user for assignment within the network, where the request identifies a desired data transmission parameter for the user's assignment (b) select a layer of the network for the user's assignment based on the desired data transmission parameter.

In yet another embodiment, the invention is an overlay network of two or more layers and an assignment manager adapted to (a) receive a request from a user for assignment within the network, where the request identifies a desired data transmission parameter for the user's assignment, and (b) select a layer of the network for the user's assignment based on the desired data throughput.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Overview

Next-generation wireless networks are envisioned to be mobile multimedia networks, in which the demand for wireless data services largely exceeds the demand for voice services. These networks will integrate a plethora of different users and applications. The success of these networks depends largely on the efficiency of the resource allocation and mobility management strategies that they employ.

Future network architectures should be able to provide the capacities to support multiple data rate services, while at the same time deal with the different mobility patterns of the users. To address this, hierarchical network architectures with different cell layers have been proposed. The respective cell sizes, their maximum throughput, and the number of supportable users distinguish between these layers.

Data vs. Voice

Data users, while in some cases requiring more aggregate bandwidth than voice users, are generally more flexible with respect to data delay and minimum continuous data rate requirements. Additionally, their usage patterns exhibit different statistical distributions than voice users. For example, email communications are much less sensitive to delays and interruptions in transmission then are voice communications. Internet access and file transfers, likewise, can tolerate a bursty communications channel, as long as reasonable response times and reasonable average throughputs are maintained. Further, due to increased buffering typically available on data devices relative to voice devices, and due to the substantially unidirectional nature of the communications, even streaming applications exhibit a greater robustness to data interruptions than do voice communications.

For data users, data throughput averaged over intervals on the order of multiple seconds is a relevant performance metric. Meanwhile, network service providers are interested in maximizing the number of satisfied data and voice users at the minimum system cost. This typically equates to optimizing the distribution and utilization of appropriate base station resources. One metric that closely tracks this optimization is overall system throughput (i.e., the sum of the individual data users' rates in a given geographical region), and one parameter relevant to this optimization in a hierarchical overlay network is the set of user assignments to layers of the overlay network over time. Assignments based on velocity and cell traversal data alone are insufficient to optimize user assignments in a voice-and-data hierarchical overlay network.

An Exemplary Hierarchical Network

Figure 1:
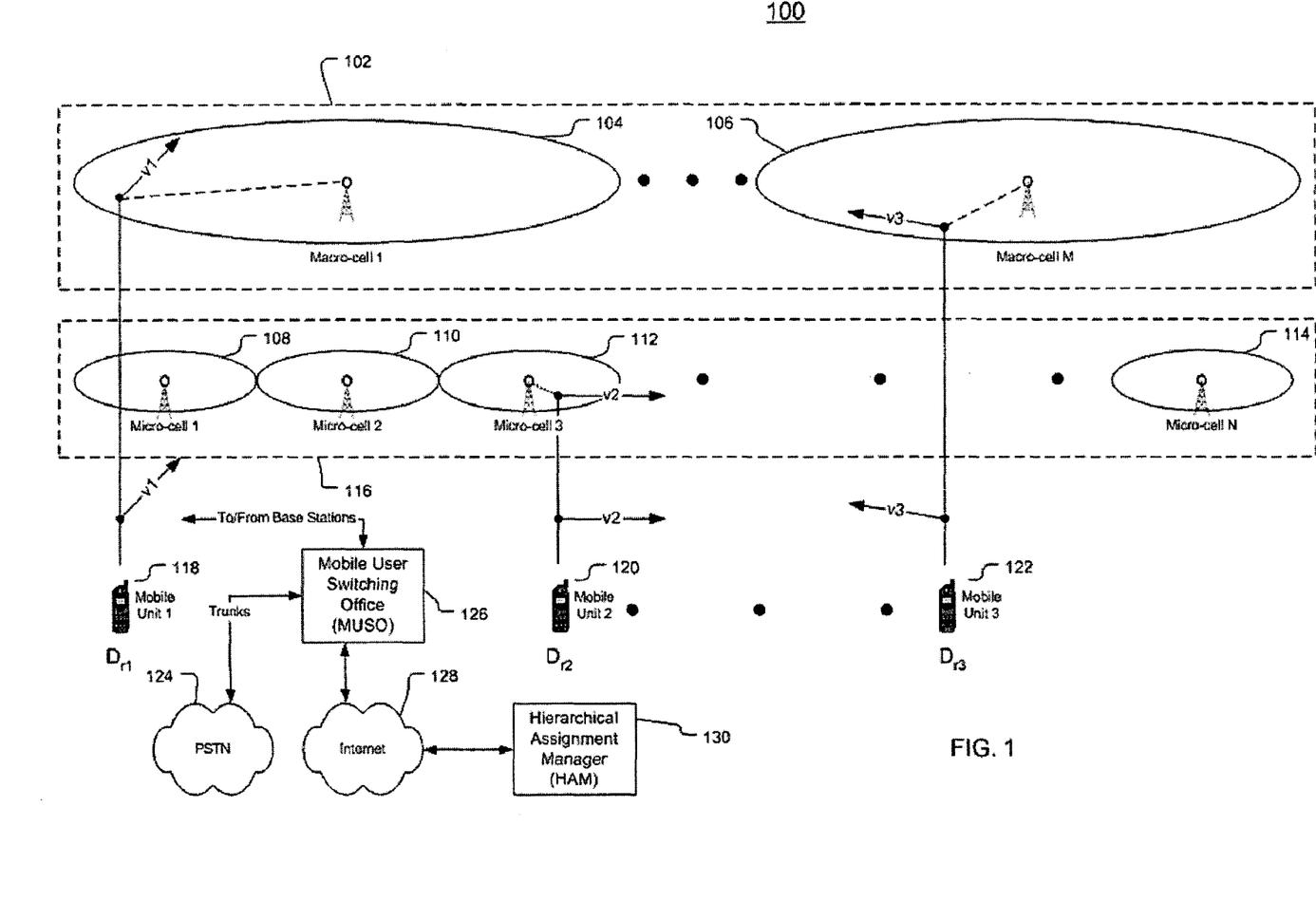
FIG. 1 illustrates an exemplary hierarchical network and assignment controller according to the present invention.

FIG. 1 depicts an exemplary hierarchical network with a hierarchical assignment manager (HAM) 130 according to one embodiment of the present invention. For simplicity, a network of only two layers is considered; however, extensions to three or more layers would be understood by one skilled in the art. The two layers depicted are referred to as the macro-cell layer and the micro-cell layer. The macro-cell layer (102) contains one or more macro-cells (e.g., macro-cells 104 and 106) that are typically configured for universal coverage of a geographical region. The micro-cell layer (116) contains one or more micro-cells (e.g., micro-cells 108, 110, 112, and 114) that are typically used to provide high throughput in local high-usage areas (i.e., areas where high usage is expected or has been experienced, for example, in and around airports, malls, traffic hubs, and convention centers).

FIG. 1 also depicts mobile units 1 118, 2 120, and 3 122. At an instant in time, mobile unit 1 118 has velocity v1, is assigned to macro-cell 1 104, and is requesting a data rate of $D_{r1}$. Mobile unit 2 120 has velocity v2, is assigned to micro-cell 3 112, and is requesting a data rate of $D_{r2}$. Finally, mobile unit 3 122 has velocity v3, is assigned to macro-cell M 106, and is requesting a data rate of $D_{r3}$.

The macro-cells and micro-cells are centered on cell sites, each of which includes transceiver equipment to support the wireless users that are assigned to that cell. The macro-cells and micro-cells are linked to mobile user switching office (MUSO) 126 (links not shown), which provides connectivity for voice calls to/from public switched telephone network (PSTN) 124 and connectivity for data calls to/from private or public Internet 128. Internet 128 also provides connectivity between the mobile users (or their proxy agents at the MUSO) and hierarchical assignment manager (HAM) 130. Alternatively, HAM 130 may be part of or co-hosted at MUSO 126, or distributed as local centers of intelligence throughout the network and base stations.

Questions of interest in the network of FIG. 1 are the assignment of users to the different layers of the hierarchy and the potential switching between layers during the course of operation of the network. In the present invention, the assignment is managed by HAM 130, which takes into account the overhead of switching, while the actual switching is managed transparently to the HAM by a lower-level manager, potentially located at MUSO 126.

Hierarchical Assignment Manager

Fundamentally, hierarchical assignment manager (HAM) 130 improves upon assignment strategies of the prior art by considering a mobile user's data rate, instead of or in addition to the mobile user's velocity.

Resource allocation and user assignment problems in hierarchical wireless networks based on velocity alone have been extensively studied in the literature. More information can be found in the following references, which have been incorporated into this specification by reference in their entirety:

M. Benveniste, "Cell Selection in Two-Tier Microcellular/Macrocellular Systems", *Proceedings of the IEEE Global Telecommunications Conference GLOBECOM* 95, vol. 2, p. 1532-1536, 1995, L. Bo, W. ChengKe and A. Fukuda, "Performance Analysis of Flexible Hierarchical Cellular Systems with a Bandwidth-Efficient Handoff Scheme", in *IEEE Transactions on Vehicular Technology*, vol. 50, No. 4, p. 971-980, July 2001, C-L. I, L. J. Greenstein and R. D. Gitlin, "A Microcell/Macrocell Cellular Architecture for Low- and High-Mobility Wireless Users", in *IEEE Journal on Selected Areas in Communications*, vol. 11. No. 6, p. 885-891, 1993, K. Maheshwari and A. Kumar, "Performance Analysis of Microcellization for Supporting Two Mobility Classes in Cellular Wireless Networks", in *IEEE Transactions on Vehicular Technology*, vol. 49, No. 2, p. 321-333, March 2000, C. W. Sung and K. W. Shum, "Channel Assignment and Layer Selection in Hierarchical Cellular System with Fuzzy Control", in *IEEE Transactions on Vehicular Technology*, vol. 50, No. 3, p. 657-663, May 2001, S-H. Wie, J-S. Jang, B-C. Shin and D-H. Cho, "Handoff Analysis of the Hierarchical Cellular System", in *IEEE Transactions on Vehicular Technology*, vol. 49, No. 5, p. 2027-2036, September 2000, and, K. L. Yeung and S. Nanda, "Channel Management in Micro/Macrocell Cellular Radio Systems", *Technical Memorandum, Bell Laboratories, AT&T,* 1994. and *IEEE Transactions on Vehicular Technology*, vol. 45, No. 4, p. 601-612, November 1996 (herein "the Yeung paper").

Prior research work focused on circuit-switched services and tailored the analysis to voice users by assuming that a fixed number of channels are available at each layer of the hierarchy and, once those channels are allocated, additional requests are blocked. Preferred embodiments of the present invention, however, assume that data users have flexible data rate requirements that can be reduced in order to accommodate additional users without dropping or blocking. It is therefore assumed that enough channel resources (e.g., channel elements, and Walsh codes) are available and do not present a limiting factor for performance. This is typically the case for well-engineered data systems, in which the throughput performance essentially depends on the available power resources, the wireless channel conditions, and the potential mutual interference between the transmitting users.

Prior research additionally focused on assignment strategies based on a user's velocity. Fast-moving users were typically assigned to macro-cells, while slow-moving or stationary users were assigned to micro-cells. The rationale behind this assignment strategy was that the number of cell boundary crossings should be limited, thus reducing the signaling overhead associated with frequent handoffs and the probability of dropping calls due to failed handoffs. However, it was not, in general, clear how to set the boundary between fast- and slow-moving users.

A strategy was proposed in the Yeung paper to select this velocity threshold in order to achieve fixed target blocking probabilities. Such assignment strategies are relevant for voice users since velocity is their only distinguishing characteristic. Data users, however, may also have various throughput requirements. These rate requirements have not previously been considered in assignment strategies, either by themselves or in combination with velocity information. The requirements and the corresponding constraints imposed on the network depend on the throughput demands, delay constraints, or tolerance to errors of the users. In addition, mobile users may have different mobility profiles (range of movement, direction, and velocity).

One might expect that users with large throughput requirements would typically be slow moving, while fast-moving users might have lower throughput demands. However, such a categorization is not necessarily correct for hybrid voice/data networks. It is possible to have fast moving users with large throughput requirements (e.g., laptop users on a train or music/video-on-demand downloads to a moving automobile entertainment system). Similarly, slow-moving users may have limited data traffic demands (such as email messages, stock quotes, and news alerts).

The HAM thus considers that wireless data users should preferably be characterized by their desired data transmission parameters (i.e., data throughput and/or the amount of data traffic they generate) or both their mobility patterns and their desired data transmission parameters. Within this context, two classes of users are considered: real-time-data users and non-real-time-data users.

Real-time-data users are assumed to have a fixed, instantaneous desired data rate, $D_r$, but are able to modulate their actual communication rate, if the channel conditions would require them to do so, typically with an associated reduction in the quality of service. It is assumed that the connection time (also called the call holding time) of these users is typically independent of their throughput requirements. For example, a music video of 3.5 minutes would take about the same amount of time to watch independent of whether it was streamed at 100 kbps or 300 kbps (ignoring the relatively insignificant buffering delays). Relevant applications include streaming multimedia services that can adjust the quality of the audio/video/image signals in order to adapt to currently available network resources and mobile web-browsers that can tune content detail to the available connection capacity or the quality of the wireless link. Voice users are grouped into the category of real-time-data users as a special case where the rate requirements are low relative to typical streaming requests (e.g., audio and video). It is also anticipated that scalable voice compression algorithms could be employed that would allow voice users to scale their bandwidth requirements to the available channel bandwidth (albeit at the cost of voice quality).

Non-real-time-data users are assumed to have a fixed amount of information to transmit and/or receive (e.g., a file to transfer or an email message to send) and are willing or able to tolerate additional delay, provided that all of the information is ultimately received reliably. In these cases, in contrast to real-time-data applications, the call holding time is dependent on the available system throughput. In that case, two different macro-cell/micro-cell layer assignment strategies are considered. One is based on the amount of data a user has to transmit or receive, independent of the user's velocity, and the other is based on a combination of the amount of data and the velocity of the user. Note that optimization based on overall system throughput will improve the performance of the system for both users with specific desired data rates (i.e., real-time-data users) as well as user's with a fixed amount of data to transmit (i.e., non-real-time-data users). In a system with only non-real-time data users, it has been shown by the inventors that the average minimum number of non-real-time data users supportable by the system and the expected system load are substantially the same for both strategies, based on the velocity information or the amount of data to be transmitted by each non-real-time data user. However, when non-real-time-data users and real-time-data users are managed by a common assignment manager, and when desired data transmission parameters (i.e., data rate and/or amount of data to be transmitted) and velocity are considered together, an improved system throughput can be achieved using the assignment apparatus and methods of the present invention.

General System Assumptions

In order to understand the operation of the HAM, a number of general assumptions are first presented. Although the operation of the HAM is described with respect to a two-layer, macro-cell/micro-cell architecture, the proposed strategy and the corresponding results are more general and extend equally well to more than two layers of cells as well as to multiple technology networks (e.g., integrated 3G and 802.11x networks) and multiple service provider networks (e.g., overlaid Sprint, Verizon, and AT&T carriers), with the assumption that wireless or even attached network devices support interface to multiple network technologies (e.g., 802.11a and 802.11b, in the case of wireless, or 100BT or IEEE1394, in the case of attached devices), as well as to the corresponding network stacks above those interfaces.

It is assumed for this discussion that network topology and the layout of the macro-cells and the micro-cells are fixed and known to the HAM. However, various techniques exist for automated discovery of dynamic topology or a priori provision of topology information to the HAM, as would be understood to one skilled in the art, but these techniques are not central to the discussion of this invention.

The micro-cells are assumed to geographically underlie macro-cells, but micro-cells do not necessarily cover each entire macro-cell. It is also assumed that an underlying control structure, instructing users to connect to the macro-cells or the micro-cells, is available. Each mobile device may transmit to (and receive from) either a macro-cell or a micro-cell (but not both a macro-cell and a micro-cell simultaneously) and is capable of choosing from different transmission rates.

The total available frequency spectrum is assumed to be divided between the macro-cells and the micro-cells in a fixed and predetermined manner. This assumption is realistic, since the frequency partitioning is not typically changed during the course of operation of the system. However, the question of the optimal partitioning is a separate optimization problem. Several techniques for partitioning have been proposed and may be extended to the current analysis (see, for example, the Yeung paper, as well as L. Ortigoza-Guerrero and A. H. Aghvami, *Resource Allocation in Hierarchical Cellular Systems*, Mobile Communications Series, Artech House Publishers, 1999, incorporated herein by reference in its entirety).

In the following, a hierarchical network model of a single macro-cell and a single micro-cell is described for illustrative purposes. However, extension of the model to address the more general scenario of several macro-cells and several micro-cells would be understood by one skilled in the art.

It is also assumed that the respective spectrum bands of the macro-cell and micro-cell layers are disjoint and non-overlapping, and possess sufficient guard bands to ensure that users at one layer of the hierarchy do not interfere with users at another layer. In addition or alternatively, these layers can be separated from each other by other types of diversity (e.g., code, time, or angular) as would be understood to one skilled in the art. However, it is assumed that users at the same layer may potentially interfere with each other. The model presented in this invention could be extended by one skilled in the art to include interference scenarios between the different layers of the architecture.

It is assumed that the users' call arrival rates to the micro-cell layer and the macro-cell layer can be modeled by Poisson processes. The call arrival rate to the micro-cell layer is denoted $\lambda_1$ and the call arrival rate to the macro-cell layer is denoted $\lambda_2$. Note that $\lambda_2$ is the call arrival rate in the macro-only region, i.e., that part of the macro-cell that is not also covered by the micro-cell. In general, $\lambda_1$ and $\lambda_2$ may be different and allow modeling of hot spots with high call volumes in the geographical regions of macro-cells and micro-cells. A call may originate in a micro-cell coverage region, but still be assigned to the corresponding macro-cell (if this is deemed to increase the system-wide performance). Thus, $\lambda_1$ and $\lambda_2$ are not the actual call arrival rates (after assignment) to the micro-cell-layer and the macro-cell-layer, respectively. Instead, they are the arrival rates in the specific geographical regions and may be determined, for example, by examining the statistics of call requests that are made by users of the system over time. The term "call arrival" here is generalized to cover both voice and data calls.

The call duration (i.e., the call holding time) of an individual user is modeled as a random process with exponentially distributed holding times with rate $\mu_c$. For real-time-data users, the call arrival and the call duration are assumed to be independent processes.

Let $D_r$ denote the requested data rate of a given user, which is assumed to be independent of the call arrival and call holding processes and depends only on the user's application. For real-time-data applications, $D_r$ is assumed to be constant during the call. The requested rate is distinct from the feasible rate $D_f$, which is the maximum transmission rate that the network can currently provide to a given user. The actual transmission rate $D_\alpha$ of a user is then the minimum of the requested rate and the feasible rate. Borrowing strategies, in which a user may be allocated the unused excess capacity from other users, are not considered here. Again, one skilled in the art could extend the described model to include scenarios where borrowing between different users is allowed. This would be reflected by a change to the Markov chain, but the essential operation of the HAM is unchanged.

The mobility of a user is measured by its average velocity V. Although it is recognized that the instantaneous speed of mobiles changes continuously, only the average speed (calculated over an appropriate time horizon) is considered in the assignment strategies of the HAM. Otherwise, constant reassignments and switching between layers may occur, leading to excessive signaling overhead, potential handoff failures, and instability.

A mobile unit is characterized by its profile of velocity V and requested data rate $D_r$. A user's profile is chosen according to the joint probability density function $f(V, D_r)$, which describes the statistical behavior of the user population. It is not necessary to assume independence between V and $D_r$. The maximum velocity and requested data rate are denoted by $V_{max}$ and $D_{max}$. Without loss of generality, it is assumed that the minimum velocity $V_{min}=0$ and the minimum requested data rate $D_{min}=0$.

The switching overhead between macro and micro cells (i.e., during the reassignment of users related to a change in the optimal decision rule or due to mobility of the users) is taken into account as an interruption of service and consequently as a decrease in achievable throughput. Although other performance criteria may be considered, maximizing the total system throughput is a relevant objective for real-time-data users.

HAM Theory of Operation

The state of the system (n,m) is identified by the number of users in the micro-cell layer (n) and the number of users in the macro-cell layer (m). The state (n,m) actually denotes the numbers of ongoing sessions in the two layers of the network. Since a single user may simultaneously open multiple sessions, for assignment purposes, these are considered different users. With a slight abuse of notation, (n,m) may also be used to refer to the number of users in a given state of a two-dimensional Markov chain that models the dynamic behavior of the system. The system remains in its present state until a call is completed, a new call arrives, or there is a mobility-induced handoff between cells. Though, in this example, the network is modeled using a Markov chain, other models of the system may also be used as would be understood to one skilled in the art.

The Markov Chain

Figure 3:
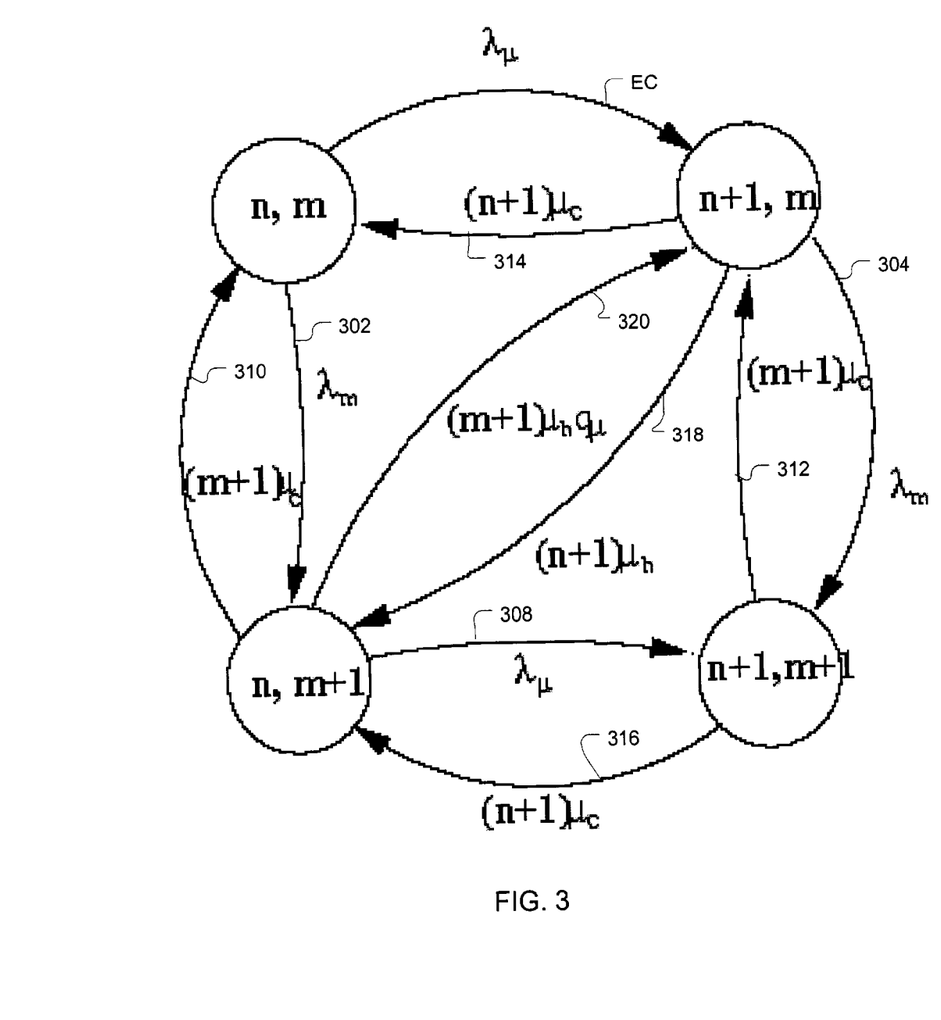
FIG. 3 illustrates one generic step of a Markov chain used in an exemplary implementation of Markov chain engine 226 of FIG. 2.

A two-dimensional Markov chain with rewards is preferably used to model the system. FIG. 3 illustrates one generic step of that chain. As represented in FIG. 3, a transition from state (n,m) to state (n+1,m) refers to the addition of one user to the micro-cell layer of the system, while a transition from state (n+1,m) to state (n,m) refers to the subtraction of one user from the micro-cell layer (e.g., at the completion of that user's session). Similarly, a transition from state (n,m+1) to state (n+1,m+1) also refers to the addition of one user to the micro-cell layer of the system, while a transition from state (n+1,m+1) to state (n,m+1) refers to the subtraction of one user from the micro-cell layer.

Analogously, a transition from state (n,m) to state (n,m+1) (or from state (n+1,m) to state (n+1,m+1)) refers to the addition of one user to the macro-cell layer of the system, while a transition from state (n,m+1) to state (n,m) (or from state (n+1,m+1) to state (n+1,m)) refers to the subtraction of one user from the macro-cell layer.

Meanwhile, a transition from state (n+1,m) to state (n,m+1) refers to the handoff of an existing user from a micro-cell to a macro-cell of the system, while a transition from state (n,m+1) to state (n+1,m) refers to the handoff of an existing user from a macro-cell to a micro-cell of the system.

The transition probabilities between nodes of the Markov chain are related to the call arrival, call holding, call handoff, and profile probabilities, which, in turn, may depend on the assignment strategy that is in use. The reward associated with each state is the achievable system throughput corresponding to that state. Although only one generic step of the Markov chain is depicted in FIG. 3, the chain should be understood to have as many steps in the horizontal and vertical direction as the maximum number of users in the system, at the micro-cell and macro-cell layers. For networks having more than two layers, the Markov chain would also extend to a third and even higher dimensions. Note also that, to avoid overcomplicating the illustration, the self-transitions for each state (e.g., corresponding to intra-layer handoffs, or no changes to the state of the system) are not explicitly shown.

In FIG. 3, $\lambda_m$ and $\lambda_\mu$ denote the actual call arrival rates to the macro-cell layer and the micro-cell layer, respectively. As noted previously, these rates are a function of the assignment activities of the HAM. $\mu_h$ is the mean outgoing handoff rate per user from the micro-cell layer to the macro-cell layer. It is based on the cell sojourn time of a mobile across a micro-cell.

The derivation of the distribution of the cell sojourn time of a mobile in the micro-cell is presented in detail in K. L. Yeung and S. Nanda, "Channel Management in Micro/Macrocell Cellular Radio Systems", IEEE Transactions on Vehicular Technology, vol. 45, No. 4, p. 601-612, November 1996, which is incorporated herein by reference in its entirety, and only the relevant results are summarized here. The handoff process is assumed Poisson, and the handoff rate $\mu_h$ is approximated by the mean boundary-crossing rate $\mu_b$ ($2 \cdot V_\mu$ divided by $\pi \cdot r_\mu$) Here, $V_\mu$ is the average velocity of users with micro-cell profiles, and $r_\mu$ is the radius of the micro-cell (assumed to be circular for convenience). $\mu_b$ could be calculated according to the above equation, or otherwise estimated by keeping track of cell boundary crossings, for example, through measurements of pilot carrier power associated with the mobile devices. $\mu_c$ is the call holding rate. It is the inverse of the average length of a call. It is derived, for example, by inverting the average of metered call lengths of all users in the system.

Referring again to FIG. 3, it can be seen that the addition of a new user to the macro-cell (transitions 302 and 304) is a function of the call arrival rate to the macro-cell $\lambda_m$, while addition of a user to the micro-cell (transitions 306 and 308) is a function of the call arrival rate to the micro-cell $\lambda_\mu$.

Some of the transition probabilities between states are also a function of the number of users in each layer of the system. For example, the deletion of a macro-cell user from the system (transitions 310 and 312) (e.g., corresponding to a macro-cell user terminating his session) is the product of the call holding rate $\mu_c$ and the number of users in the macro-cell layer (prior to the deletion). Likewise, the deletion of a user from the micro-cell (transitions 314 and 316) is the product of the call holding rate $\mu_c$ and the number of users in the micro-cell layer. Finally the transition (318) of a user from the micro-cell layer to the macro-cell layer of the system is a function of the call handoff rate $\mu_h$ and the number of users in the micro-cell, while the transition (320) of a user from the macro-cell layer to the micro-cell layer of the system is the product of the call handoff rate $\mu_h$, the number of users in the macro-cell layer of the system, and additionally the probability $q_\mu$ that a user has a micro-cell profile.

The user's location, profile, and macro-cell/micro-cell layer assignment are assumed to be unique. The user's location refers to the geographical position of the user, and it is independent of the assignment strategy. On the other hand, a user is considered to have a particular macro-cell or micro-cell profile if its velocity and requested rate (V,$D_r$) characteristic is consistent with the requirements for assignment to the macro-cell layer or the micro-cell layer, respectively, with respect to a particular assignment strategy that is being employed by the HAM. The profile thus refers to the preferred assignment of the user. The user's actual assignment refers to the outcome of the assignment process. The subtle distinction is of particular interest when a particular macro-cell is not fully covered by micro-cells. In this case, a user with a micro-cell profile who is not within the coverage region of a micro-cell is assigned to the macro-cell layer. In other words, a user with a micro profile can be assigned or transferred to a micro-cell only if it is within the coverage region of a micro-cell. Otherwise, the user is assigned or transferred to the corresponding macro-cell.

$q_m$ and $q_\mu$ denote the probabilities that a given user has a macro-cell or a micro-cell profile, respectively (where, as discussed before, $q_m$ and $q_\mu$ depend on the assignment strategy and the model call assignment rates). The probabilities that a user is assigned to the macro-cell layer or to the micro-cell layer, respectively, are:

$$P_r(m) = q_m + \frac{\lambda_2}{\lambda_1 + \lambda_2} \cdot q_\mu \quad (1)$$

$$P_r(\mu) = \frac{\lambda_1}{\lambda_1 + \lambda_2} \cdot q_\mu \quad (2)$$

where $\lambda_1$ and $\lambda_2$ are the arrival rates to the micro-cell coverage region and to the macro-cell coverage region, respectively. The actual call arrival rates to the macro-cell layer and to the micro-cell layer, respectively, can be computed as follows:

$$\lambda_m = \lambda_2 + \lambda_1 \cdot q_m \quad (3)$$

$$\lambda_\mu = \lambda_1 \cdot q_\mu \quad (4)$$

In a preferred embodiment, the reward T(n,m) associated with state (n,m) is the system-wide objective of effective system throughput when there are n users in the micro-cell layer and m users in the macro-cell layer. The effective system throughput takes into account the handoff cost (switching or reestablishment of the call after a failed handoff) by modeling the resulting interruption of service by an opportunity cost in throughput. Note that, in alternative embodiments, alternative rewards, associated with alternative system-wide objectives (e.g., the average number of users in the system or the expected system load seen by a new user), are possible as would be understood to one skilled in the art. In these alternative embodiments, the HAM and the optimization units would operate similarly to the way they operate in the current embodiment. A difference would be the reward calculation associated with the alternative system-wide objective. Alternative system-wide objectives include those that are a function of the state of the system, i.e., the number of users at the macro-cell and micro-cell layers.

Letting $D_f^{(m)}$(m) denote the feasible transmission rate per user given m users are assigned to the macro-cell layer and letting $D_f^{(\mu)}$(n) denote the feasible transmission rate per user given n users are assigned to the micro-cell layer, then $D_f^{(m)}$(m) and $D_f^{(\mu)}$(n) depend on the underlying technologies and protocols at the physical and link layers of the system. The framework of the HAM strategy does not need to assume a specific technology and can be adapted to various scenarios, depending on the power control scheme, the scheduling algorithm, or the coding and modulation schemes. As stated earlier, the actual transmission rate is defined as the minimum between the requested and the feasible rates. The average per-user throughput is then obtained by taking the expectation of the actual transmission rate with respect to the users in the macro-cell and micro-cell layers. Specifically:

$$D_a^{(\mu)}(n) = E[\min\{D_r, D_f^{(\mu)}(n)\}] \quad (5)$$
$$= \int_{d_r=0}^{D_{max}} \min\{D_r, D_f^{(\mu)}(n)\} f_{D_r|\mu}(d_r) d d_r$$

$$D_a^{(m)}(m) = E[\min\{D_r, D_f^{(m)}(m)\}] \quad (6)$$
$$= \int_{d_r=0}^{D_{max}} \min\{D_r, D_f^{(m)}(m)\} f_{D_r|m}(d_r) d d_r$$

where the conditional probability density functions $f_{D_r|m}$ and $f_{D_r|\mu}$ of the requested data rates with respect to the macro-cell layer and to the micro-cell layer, respectively, are first calculated, specific to the assignment strategy under consideration. The conditional probabilities $P_r(D_r \leq d_r|m)$ and $P_r(D_r \leq d_r|\mu)$ are computed through applications of Bayes' rule. Taking the derivative with respect to $d_r$ then yields the conditional density functions.

Next, the loss in throughput due to the interruption of service while a user is in a handoff situation is considered. Let $t_{ho}$ denote the time required to complete a handoff between the macro-cell layer and the micro-cell layer, and let $t_{(n,m)}$ denote the average time that the Markov chain is in state (n,m) where $t_{ho}$ is understood to be smaller than the average time a user spends in the micro-cell. The state of the Markov chain changes upon a new call arrival, a call termination, or a mobility-induced handoff. Since all of the underlying processes are assumed to be Poisson, then $$t_{(n,m)} = \frac{1}{(n+m)(u_h + u_c) + \lambda_1 + \lambda_2}.$$

When a user moves from the micro-cell layer to the macro-cell layer, the relative loss in throughput for this particular user is computed as:

$$D_a^{(\mu)}(n) \cdot \frac{t_{ho}}{t_{(n,m)}}.$$

The loss in throughput when a user moves from the macro-cell layer to the micro-cell layer is similarly computed. Note that a loss in throughput only occurs for the state transitions associated with user movement. Thus, the average effective system throughput for state (n,m) can be computed as:

$$T(n,m) = nD_a^\mu(n)\left[1 - u_h \frac{t_{ho}}{t_{(n,m)}}\right] + mD_a^m(m)\left[1 - u_h q_\mu \frac{t_{ho}}{t_{(n,m)}}\right] \quad (7)$$

Finally, the performance metric used to evaluate different assignment strategies is the total effective system throughput as given by:

$$T = \Sigma_{(n,m)} \pi(n,m) T(n,m) \quad (8)$$

where $\pi(n,m)$ is the steady-state probability of state (n,m) in the Markov chain. A closed-form solution for $\pi(n,m)$ is beyond the scope of this discussion; however, in practice, simulations of the dynamic behavior of the system are used to evaluate the steady-state probabilities of the system numerically.

Assignment Strategies

Where data users are distinguished by their respective velocities and requested data rates, an intelligent assignment decision may be based on one or both of these profile parameters. Since the architecture has two layers, the user population is partitioned into two subsets: one corresponding to the macro-cell layer and the other corresponding to the micro-cell layer.

One possible assignment strategy is a velocity-based assignment strategy (VAS), characterized by a velocity threshold $V_0$, where users with average velocity $V > V_0$ have a macro-cell profile and users with average velocity $V \leq V_0$ have a micro-cell profile. According to this strategy, requested data rates variations between users are ignored. There are a number of different methods for estimating each user's velocity as would be understood to one skilled in the art. The rationale behind this strategy is to reduce the number of handoffs. The profile probabilities can be computed as follows:

$$q_m = \int_{v=V_0}^{V_{max}} \int_{d_r=0}^{D_{max}} f_{V,D_r}(v,d_r) d d_r dv \quad (9)$$

$$q_\mu = \int_{v=0}^{V_0} \int_{d_r=0}^{D_{max}} f_{V,D_r}(v,d_r) d d_r dv \quad (10)$$

Another possible assignment strategy, is called the rate-based assignment strategy (RAS). It is based on the requested data rates, is independent of user velocities, and is characterized by a rate threshold $D_0$. Users, whose requested data rate is larger (smaller) than the threshold, have a micro-cell (macro-cell) profile. The rationale behind this strategy comes from the assumption that the inherent capacity of the micro-cell layer is larger than that of the macro-cell layer. The macro-cell and micro-cell profile probabilities in this case are computed as:

$$q_m = \int_{d_r=0}^{D_0} \int_{v=0}^{V_{max}} f_{V,D_r}(v,d_r) dv d d_r \quad (11)$$

$$q_\mu = \int_{d_r=D_0}^{D_{max}} \int_{v=0}^{V_{max}} f_{V,D_r}(v,d_r) dv d d_r \quad (12)$$

Velocity-based assignment strategies have been considered in the prior art. However, strategies that consider data rate with or without velocity provide advantages in practical network applications. Such strategies, referred to herein as VRAS strategies, combine the rationales behind the VAS and the RAS strategies. With respect to VRAS strategies, it might be reasonable to assign slow-moving users with large data rates to the micro-cell layer. Similarly, fast-moving users with low-data-rate requests might be assigned to the macro-cell layer. However, how to assign users in the remaining two cases (i.e., slow users with low data rates and fast users with high data rates) is more involved. Even if a mechanism is derived that can jointly set the thresholds for velocity and data rates, such a categorization into four user classes might not be entirely satisfactory. Therefore, a preferred implementation utilizes a less-drastic decision rule.

To obtain this decision rule, the two-dimensional velocity/data-rate plane is partitioned into two disjoint regions $G_m$ and $G_\mu$, by an assignment curve G. A user has a macro-cell profile or a micro-cell profile depending on whether the user's velocity-rate pair falls into $G_m$ or $G_\mu$, respectively. The call arrival rates to the macro-cell layer and to the micro-cell layer can then be calculated from the probabilities that the user's (V,$D_r$) pair falls in $G_m$ and $G_\mu$, respectively.

Let $d_r = g(v)$ be the function with graph G. A priori, the function g is not constrained. However, intuition and understanding of the network operation lead to the following assumptions regarding the properties of a good assignment curve. First, the function g is monotonically non-decreasing. Further, since $V_{min}=0$ and $D_{min}=0$, then $g(0)=0$ and $g(V_{max})=D_{max}$. $G_m$ is the region below the curve, i.e., the set of all pairs (v,$d_r$) such that $d_r \leq g(v)$. Similarly $G_\mu$ is the region above the curve corresponding to all pairs such that $d_r > g(v)$. If the function g were not monotonically non-decreasing, there would exist a data rate $d_r^*$ and two velocities $v_1$ and $v_2$ such that $v_1 < v_2$, $d_r^* < g(v_1)$, and $d_r^* \leq g(v_2)$. In other words, a user with velocity $v_1$ would be assigned to the macro-cell layer, but a user with larger velocity $v_2$ (but the same data rate) would be assigned to the micro-cell layer. Such a situation is counterintuitive since one would expect fast (or faster) users to be assigned to the macro-cell layer.

What remains is to find an assignment curve that maximizes the total system throughput. Rather than searching over the entire space of monotonically non-decreasing functions, in a preferred implementation, only the subspace of piecewise linear functions is considered. Further, in the preferred implementation, the functions are further restricted to those functions parameterized by two pairs $(V_1,D_1)$ and $(V_2,D_2)$, where $(V_2 \geq V_1)$ and $(D_2 \geq D_1)$. The corresponding assignment curve $d_r=g(v)$ is called a two-point assignment curve and is given by the following piecewise linear description:

$$d_r = \begin{cases} \frac{D_1 - D_{min}}{V_1 - V_{min}}[v - V_{min}] + D_{min} & \text{if } V_{min} \leq v \leq V_1 \\ \frac{D_2 - D_1}{V_2 - V_1}[v - V_1] + D_1 & \text{if } V_1 \leq v \leq V_2 \\ \frac{D_{max} - D_2}{V_{max} - V_2}[v - V_2] + D_2 & \text{if } V_2 \leq v \leq V_{max} \end{cases} \quad (13)$$

Figure 4:
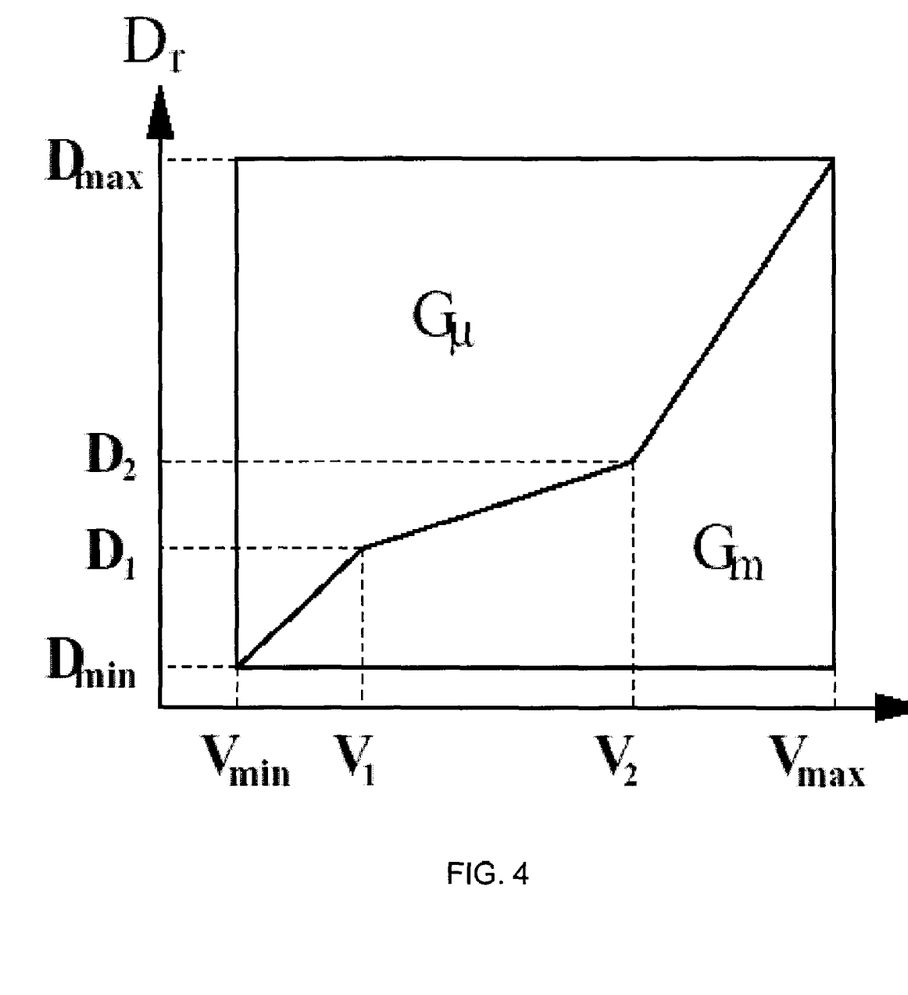
FIG. 4 illustrates an exemplary piecewise linear assignment curve according to the present invention.

A typical such piecewise linear assignment curve is shown in FIG. 4. The family of all two-point assignment curves is quite rich and includes, as special cases, the VAS strategy which considers only velocity and the RAS strategy which considers only data rate. For example, the VAS strategy is obtained by setting $V_1=V_0$, $V_2=V_0$, $D_1=0$, and $D_2=D_{max}$. Similarly, the RAS strategy is obtained by setting $V_1=0$, $V_2=V_{max}$, $D_1=D_0$, and $D_2=D_0$. Increasing the number of points would allow one to more accurately approximate more general functions; however, the computational complexity when determining the throughput-optimal assignment curve increases exponentially with the number of such points. A two-point assignment curve provides an appropriate compromise between performance and complexity.

The respective profile probabilities can be computed from the joint distribution and the assignment curve as follows:

$$q_m = Pr((V, D) \in G_m) \quad (14)$$
$$= \int_{v=V_{min}}^{V_{max}} \int_{d_r=D_{min}}^{g(v)} f_{V,D_r}(v, d_r) dv\, dd_r$$

$$q_\mu = Pr((V, D) \in G_\mu) \quad (15)$$
$$= \int_{v=V_{min}}^{V_{max}} \int_{d_r=g(v)}^{D_{max}} f_{V,D_r}(v, d_r) dv\, dd_r$$

Finally, in order to compute the conditional mean velocity $\overline{V}_\mu$ (used in the calculation of $\mu_h$), it is first useful to derive the conditional distribution function of the velocity, given a user assignment to the micro-cell layer, as follows:

$$Pr(V \leq v | \mu) = \frac{1}{q_\mu} \int_{u=V_{min}}^{v} \int_{d_r=g(v)}^{D_{max}} f_{V,D_r}(u, d_r) du\, dd_r \quad (16)$$

The conditional probability distribution function $f_{V|\mu}(v,\mu)$ is obtained after taking the derivative with respect to v. The conditional mean velocity is then:

$$\overline{V}_\mu = \int_{v=V_{min}}^{V_{max}} v f_{V|\mu}(v | \mu) dv \quad (17)$$

The optimal crossover points $(V_1,D_1)$ and $(V_2,D_2)$ for this family of assignment curves are selected to maximize the total system throughput. Note that the optimal assignment curve depends on the joint probability density function of the velocity and the requested data rate. However, the optimal design parameters can be adapted to changes in the behavior of the user population.

Exemplary HAM Implementation

Figure 2:
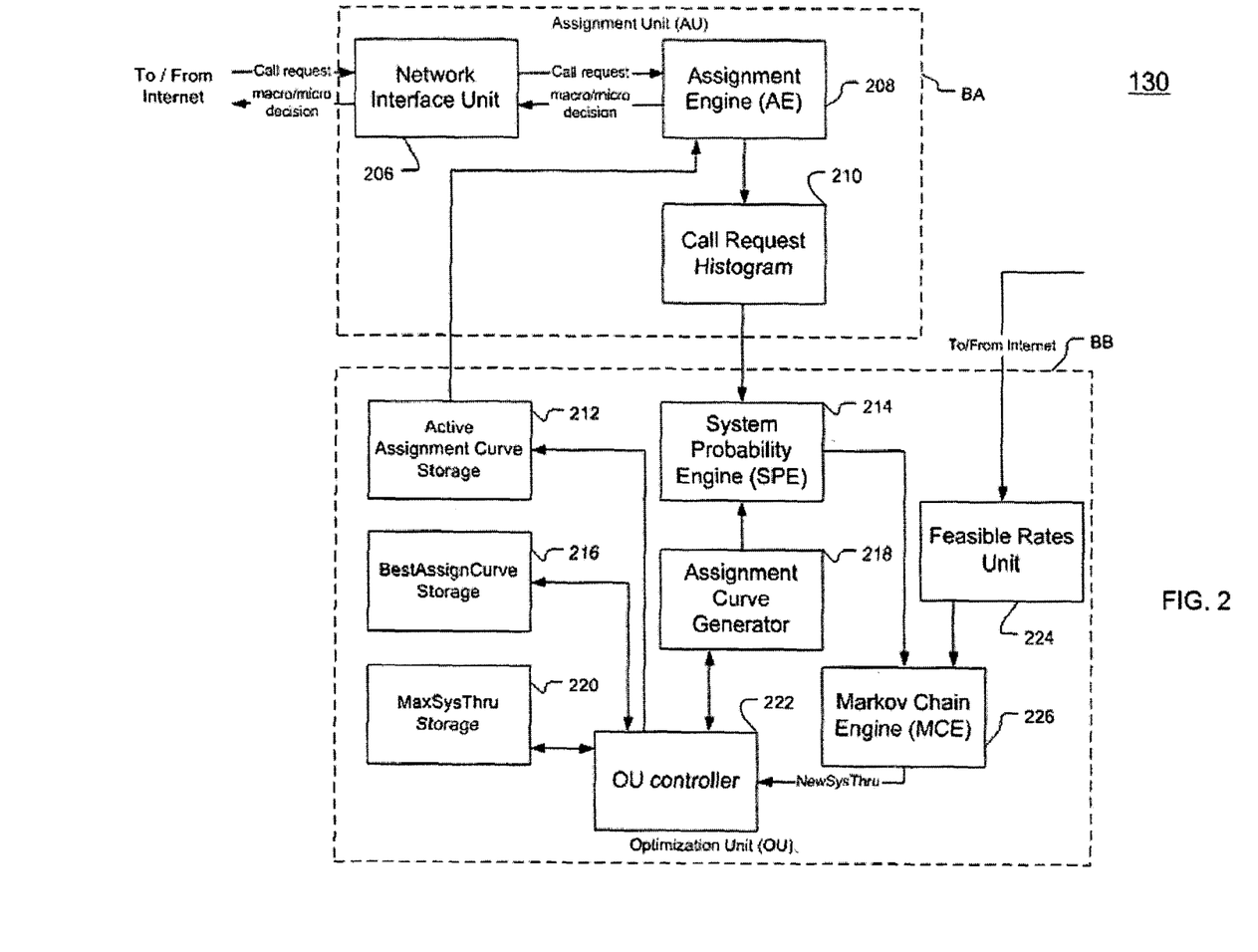
FIG. 2 illustrates an exemplary implementation of hierarchical assignment manager (HAM) 130 of FIG. 1.

FIG. 2 shows one possible implementation of hierarchical assignment manager (HAM) 130 of FIG. 1. FIG. 2 depicts assignment unit (AU) 202 and optimization unit (OU) 204. The AU handles the dynamic assignment of users to the macro-cell layer or the micro-cell layer in the system based on an active assignment curve, while the OU handles the offline processing of histogram data to generate the assignment curves that are used by the AU in the dynamic assignment decision. The calculation of the active assignment curve by the OU can be done periodically or based on system or environmental conditions (e.g., after significant changes in the histogram or crossing a date or time boundary that corresponds to an a priori known change in user profiles).

AU 202 includes network interface unit 206, which interfaces the assignment unit to the Internet, thereby providing connectivity between the AU and the mobile subscriber base via the mobile user switching office (FIG. 1 126). Call requests from mobile users, which include velocity and desired data-rate information, are received by network interface unit 206 and passed to assignment engine 208 for processing. To make assignment decisions, assignment engine (AE) 208 makes use of the active assignment curve that is calculated by the optimization unit. The call request information received from each mobile user is time-stamped and stored in a call request histogram (210) for analysis by the optimization unit. The assignment result of the AE is sent back to the mobile user via network interface unit 206 and also optionally stored, along with other identifying information, in a user database in mobile user switching office 126 for the purpose of maintaining the layer assignment through a low-level handoff.

Figure 5:
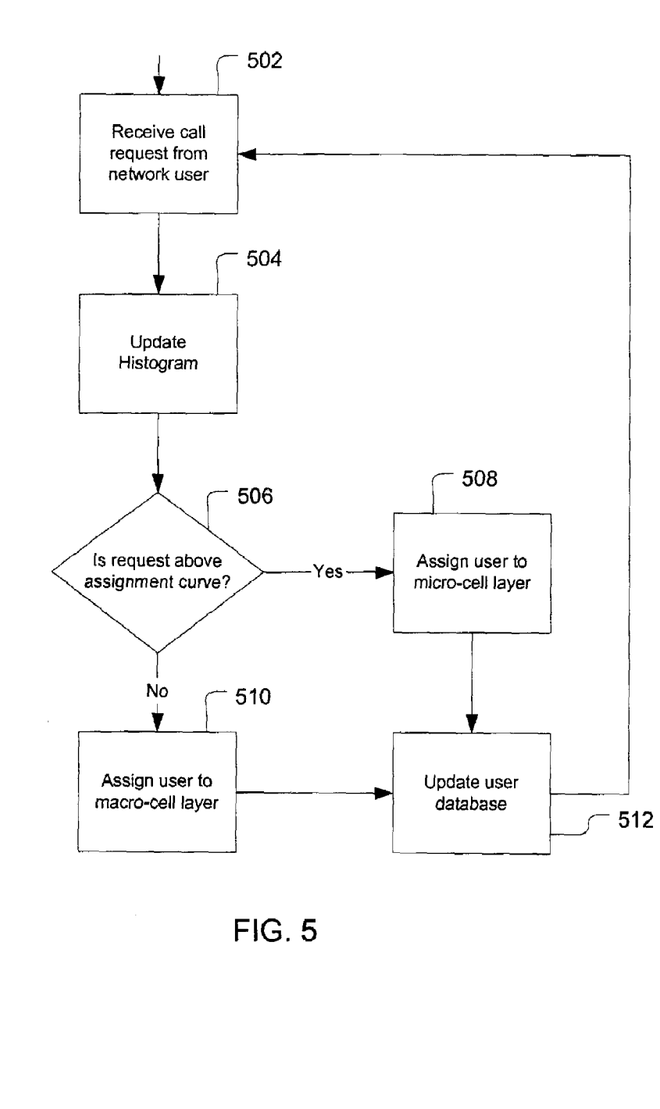
FIG. 5 is a flow diagram illustrating the operation of assignment unit (AU) 202 of FIG. 2.

The operation of the assignment unit is captured by the flow diagram of FIG. 5. As shown, following receipt of a call request (which includes velocity and rate information) in step 502, in step 504, the AU timestamps the request and stores the information in the histogram for later use by the optimization unit. In step 506, the AU compares the request to the active assignment curve. If the velocity and rate values for the request fall above the assignment curve (i.e., in the $G_\mu$ region of the velocity-rate plane per FIG. 4), then, in step 508, the user is assigned to the micro-cell layer. Otherwise, in step 510, the user is assigned to the macro-cell layer. In either case, in step 512, the user database is updated and control returns to step 502 where the AU waits for another call request to be received.

Referring again to FIG. 2, optimization unit (OU) 204 includes system probability engine (SPE) 214, assignment curve generator 218, Markov chain engine (MCE) 226, and feasible rates unit 224, all under the control of OU controller 222. OU 204 also includes storage elements for the active assignment curve (212) and the parameters BestAssignCurve (216) and MaxSysThru (220).

The OU generates the active assignment curve that is used by the assignment unit over a period of time to produce reasonably optimized assignment decisions. Since the operations run in the OU are somewhat computationally intensive, and since it is not anticipated that the user profiles are going to vary greatly over short periods of time, it is assumed in this implementation that the OU will run periodically as an offline task (e.g., every 15 minutes or so, or only when significant changes are detected in the histogram). Thus, from the perspective of the AU, the active assignment curve remains constant until the OU is run and the assignment curve is updated.

At a top level, the operation of the OU generates a set of assignment curves and then selects the one that maximizes the overall system throughput (per Equation (8)). To do this, as a function of each assignment curve, the statistics of the user population are derived from the histogram and a Markov chain is run to estimate the system throughput that would result if that assignment curve were used.

Figure 6:
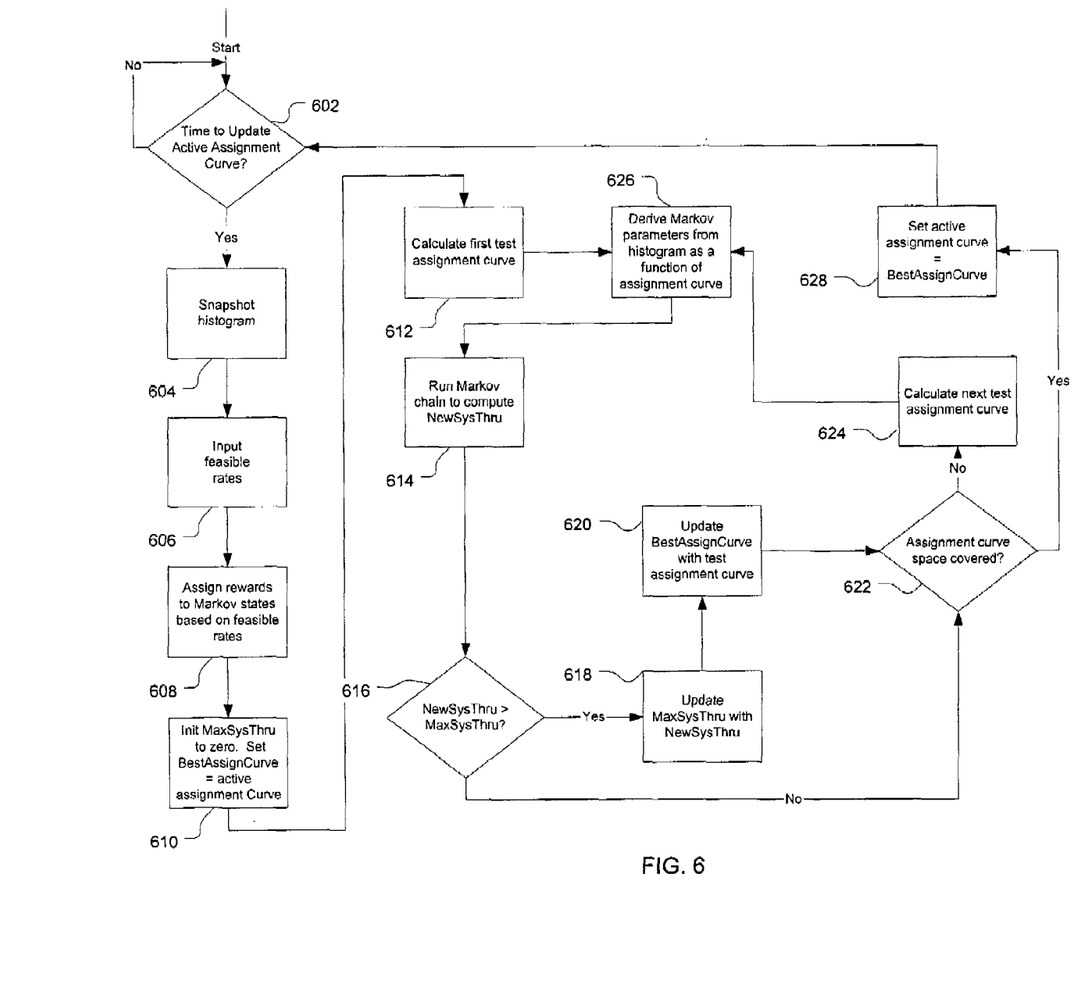
FIG. 6 is a flow diagram illustrating the operation of optimization unit (OU) 204 of FIG. 2.

FIG. 6 provides an overview of the operation of the OU. In step 602, the OU determines whether or not it is time to update the assignment curve. As discussed previously, the update determination could be based on the expiration of some a priori fixed interval timer. The interval could vary based on the time of day, the day of the week, or even the season of the year. In addition or alternatively, the update could be triggered by an assessment of the relative "freshness" of the histogram relative to its state the last time the active assignment curve was updated. If it is time to update the assignment curve, in step 604, the OU reads a snapshot of the histogram from the AU. Next, in step 606, a table of feasible rates is read from the feasible rates unit, and in step 608 these feasible rates are used to determine rewards for the Markov states according to Equation (7). Note that, because the statistics of the network might vary considerably over the course of a day, or between a workday and a weekend day, in some implementations, multiple histograms might be maintained, each one specific to a period of interest (e.g., noon to evening, or midnight to morning).

In step 610, the optimization is set up with the initialization of system-throughput parameter MaxSysThru to zero and the setting of BestAssignCurve equal to the active assignment curve. In step 612, the optimization loop begins with the generation of a first test assignment curve, and, in step 626, the Markov parameters (other than the rewards) are derived or calculated as a function of the histogram snapshot and the test assignment curve. In step 614, the Markov chain is run to compute the system throughput NewSysThru as a function of the test assignment curve and the Markov parameters, and, in step 616, NewSysThru is compared with MaxSysThru. If NewSysThru is greater than MaxSysThru, then a new local maximum system throughput has been found and thus, in step 618, MaxSysThru is updated to this new maximum, and, in step 620, the parameters of BestAssignCurve are replaced with the current test assignment curve parameters.

Following this, or if no new local maximum system throughput was found, a test is done in step 622 to determine whether all the intended assignment curves were tested. If they were not, then, in step 624, the next test assignment curve is generated and control returns to step 626 where the next set of parameters is calculated for the Markov chain engine. The loop repeats until all assignment curves have been tested. If the test in step 622 determines that all assignment curves have been tested, then, in step 628, the active assignment curve is replaced by the current best assignment curve BestAssignCurve and control returns to step 602 where the OU waits until it is again time to update the active assignment curve.

As noted previously, the rewards for the Markov chain are calculated as a function of the feasible rates of the system. These feasible rates can be a priori determined by calculation or model, or they can be determined from historical performance data that is derived from the system itself. For example, if a micro-cell is implemented as an 802.11b wireless LAN, then the feasible rates could be a table or function that yields the throughput of the system as a function of the number of users in the micro-cell layer starting at a maximum throughput per user of 11 Mbps for the case of n=1 and decreasing exponentially as the number of users n is increased. Rather than using a theoretical model, the table or function may be derived as a result of the actual observed throughput statistics of the micro-cell layer under different loading conditions. Similarly, the feasible rates of the joint micro-cell/macro-cell system might be updated or modified as a function of empirical data from this or related networks. Thus, feasible rates unit 224 of FIG. 2 is anticipated to include means (e.g., an SNMP interface) for updating the feasible rates that are used in the operation of the OU.

Markov Chain Parameters

Figure 7:
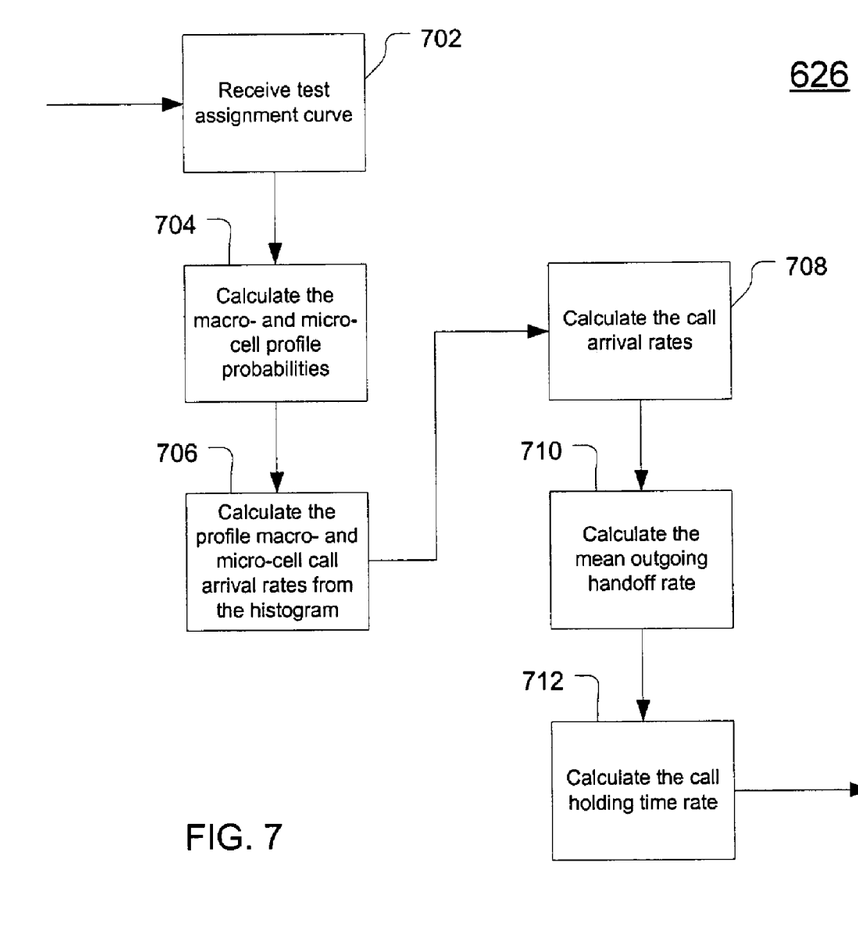
FIG. 7 is a flow diagram illustrating the process of derivation of the Markov parameters per step 626 of FIG. 6.

FIG. 7 provides an overview of the computation process used to derive the Markov chain input parameters (FIG. 6 626) in one implementation of the HAM of this invention.

In step 702, SPE 214 of FIG. 2 receives a test assignment curve from assignment curve generator 218. Based on the assignment curve and the histogram data, which approximates the joint probability distribution function of the user population, in step 704, the SPE calculates the macro-cell and micro-cell profile probabilities $q_m$ and $q_\mu$, respectively, according to numerical (i.e., discretized) versions of Equations (14) and (15). Next, in step 706, using the time-stamped information (also read from the histogram) that is associated with the call request data, the SPE numerically estimates the profile call arrival rates $\lambda_2$ and $\lambda_1$ for the macro-cell and micro-cell layers, respectively. Using the profile call arrival rates, in step 708, the SPE calculates the (post assignment) call arrival rates $\lambda_m$ and $\lambda_\mu$ according to Equations (3) and (4). Finally, the mean outgoing handoff rate $\mu_h$ is approximated in step 710 using the mean boundary-crossing rate as discussed earlier, and the call holding time rate $\mu_c$ is derived from the histogram data in step 712.

CONCLUSION

Embodiments of the present invention provide a solution for the assignment of data users in wireless overlay networks under a general framework. The dynamic system behavior is modeled as a Markov chain with rewards, where the reward in each state corresponds to the achievable system throughput. Different assignment strategies have been proposed. A preferred embodiment utilizes a joint decision rule since, in many cases of interest, it outperforms strategies based on data rate or velocity alone.

This invention is applicable to systems with different underlying link-layer technologies and a wide diversity of system parameters. A preferred embodiment utilizes a two-point assignment curve; however, the invention is equally applicable to higher-order continuous-assignment-curve approximations. Alternatively, the assignment curve could be replaced with a data-rate vs. velocity assignment grid of selectively finer and finer data-rate and velocity quantization (i.e., resolution) if this were preferable from a computational or performance point of view.

Embodiments of the invention have been discussed in terms of real-time-data users whose connection time is independent of the received throughput. These users are assumed to adapt their transmission rate to the feasible rate and capacity provided by the network. This adaptation may be achieved transparently to the user or alternatively with the user in the decision loop. The latter case might be implemented using, for example, a bandwidth selection menu that is presented to the user by a HAM client that is local to the user's mobile device.

Alternatively or additionally, this invention may be applied to non-real-time-data users. The connection time of such users depends on the maximum allowed rate of transmission, the number of users in the system, and thus ultimately on the assignment strategy. In this case, the feasible rates unit would be different for real-time-data and non-real-time-data users.

Although the exemplary Markov chain used for illustrative purposes in this discussion models the simple case of a single micro-cell located in the coverage region of the macro-cell, one skilled in the art would understand that the multiple micro-cell scenario can be modeled by a basic extension of the illustrated case. For example, one possibility is to treat the case of multiple micro-cells as if all these micro-cells constitute one "super"-micro-cell. However a more accurate analysis utilizes a $K_\mu+1$ dimensional Markov chain, where $K_\mu$ is the number of micro-cells in the coverage region of the macro-cell. The state of the Markov chain is now given by $(n_1, n_2, \ldots, n_{K_\mu}, m)$ where $n_i$ is the number of users assigned to micro-cell i, and m is the number of users in the macro-cell. The transition probabilities should be adjusted to reflect the probability of a user moving from cell i to cell j.

On-line decision algorithms that consider the actual state of the network (e.g., loading and past assignment decisions) when making an assignment decision for a new user or a user in a handoff situation may be employed. Additionally or alternatively, prediction of user movement and future call arrivals may be employed. Furthermore, the decision process may be enhanced to take into account the state of the transmission queues, the information backlog, the number of outstanding requests, as well as more sophisticated knowledge of cell topology and user mobility.

The invention has been described in the context of hierarchical overlay networks in which each macro-cell has zero, one, or more micro-cells, and each micro-cell lies entirely within a single corresponding macro-cell. The invention is not necessarily limited to such networks. For example, in real-world implementations, adjacent macro-cells and adjacent micro-cells overlap with one another to enable soft handoffs within a given level of the hierarchy. As such, the invention could be implemented in the context of hierarchical overlay networks in which one or more micro-cells each lie within two or more overlapping macro-cells.

For illustration purposes, in the present discussion, switching cost was modeled as having an opportunity cost that translates into a decrease in effective throughput. This model quite accurately captures an interruption of service of fixed time duration (due to a handoff or the need to re-establish a connection after a call is dropped). However, there are other costs related to the reassignment of users, such as the cost of computing the optimal assignment rules and the cost of adapting to time-varying user behavior. The signaling traffic overhead associated with reassigning users is also of interest. Although these other parameters have not been explicitly addressed in this discussion, handling them would be understood by one skilled in the art given the context of this specification.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation as a single integrated circuit, a multi-chip module, a single card, or a multi-card circuit pack either in a single location or in distributed fashion. As would be apparent to one skilled in the art, various functions of circuit elements may also be implemented as processing steps in a software program. Such software may be employed in, for example, a digital signal processor, micro-controller, or general-purpose computer.

We claim:

1. A computer-implemented method for assigning users in an overlay network having two or more layers, comprising:
   receiving a request from a user for assignment within the network, wherein the request identifies (1) a desired data transmission parameter for the user's assignment and (2) velocity of the user, wherein the velocity is independent of the desired data transmission parameter; and
   selecting a layer of the network for the user's assignment based on both the desired data transmission parameter and the velocity, wherein the network layer for the user's assignment is selected by comparing the desired data transmission parameter and the velocity to an assignment curve that is dependent on both data transmission parameter and velocity.

2. The invention of claim 1, wherein the overlay network is a wireless, hierarchical overlay network comprising at least first and second layers, each layer comprising one or more cells.

3. The invention of claim 1, wherein:
   the user is a real-time-data user;
   the desired data transmission parameter is a desired data rate; and
   the network layer for the user's assignment is selected based on the desired data rate and the velocity.

4. The invention of claim 1, wherein the assignment curve is a piecewise linear curve connecting two or more points in a two-dimensional space having data transmission parameter and velocity as its two dimensions.

5. The invention of claim 1, wherein:
   the user is a non-real-time-data user;
   the desired data transmission parameter is a desired amount of data associated with the user's assignment; and
   the network layer for the user's assignment is selected based on the desired amount of data and the velocity.

6. The invention of claim 1, further comprising modeling the network to determine criteria used in selecting the network layer for the user's assignment.

7. The invention of claim 6, wherein the modeling comprises using a Markov chain.

8. The invention of claim 6, wherein the modeling is used to estimate system throughput as a function of two or more assignment curves, wherein an assignment curve that yields the highest system throughput is used to select the network layer for the user's assignment.

9. The invention of claim 1, wherein:
   the desired data transmission parameter is one of desired data rate and desired amount of data; and
   the greater the value of the desired data transmission parameter, the higher the probability that the method will select a lower layer in the overlay network for the user's assignment.

10. An assignment manager for assigning users in an overlay network having two or more layers, wherein the assignment manager:
   receives a request from a user for assignment within the network, wherein the request identifies (1) a desired data transmission parameter for the user's assignment and (2) velocity of the user, wherein the velocity is independent of the desired data transmission parameter; and
   selects a layer of the network for the user's assignment based on both the desired data transmission parameter and the velocity, wherein the network layer for the user's assignment is determined by comparing the desired data transmission parameter and the velocity to an assignment curve that is dependent on both data transmission parameter and velocity.

11. The invention of claim 10, wherein the overlay network is a wireless, hierarchical overlay network comprising at least first and second layers, each layer comprising one or more cells.

12. The invention of claim 10, wherein:
   the user is a real-time-data user;
   the desired data transmission parameter is a desired data rate; and
   the network layer for the user's assignment is based on the desired data rate and the velocity.

13. The invention of claim 10, wherein the assignment curve is a piecewise linear curve connecting two or more points in a two-dimensional space having data transmission parameter and velocity as its two dimensions.

14. The invention of claim 10, wherein:
   the user is a non-real-time-data user;
   the desired data transmission parameter is a desired amount of data associated with the user's assignment; and
   the network layer for the user's assignment is based on the desired amount of data and the velocity.

15. The invention of claim 10, further comprising a model of the network used to determine criteria used to determine the layer of the network for the user's assignment.

16. The invention of claim 15, wherein the model is a Markov chain.

17. The invention of claim 15, wherein the model is used to estimate system throughput as a function of two or more assignment curves.

18. The invention of claim 17, wherein an assignment curve that yields the maximum system throughput is selected as the criteria used to determine the layer of the network for the user's assignment.

19. The invention of claim 10, wherein:
   the desired data transmission parameter is one of desired data rate and desired amount of data; and
   the greater the value of the desired data transmission parameter, the higher the probability that the assignment manager will select a lower layer in the overlay network for the user's assignment.

20. A computer-implemented method for assigning users in an overlay network having two or more layers, comprising:
   receiving a request from a user for assignment within the network, wherein the request identifies a desired data transmission parameter for the user's assignment; and
   selecting a layer of the network for the user's assignment based on the desired data transmission parameter, wherein:
   the user is a real-time-data user;
   the desired data transmission parameter is a desired data rate;
   the network layer for the user's assignment is selected based on the desired data rate;
   the request further identifies velocity of the user;
   the network layer for the user's assignment is selected based on the velocity; and
   the network layer for the user's assignment is selected by comparing the desired data rate and the velocity to an assignment curve that is dependent on both data rate and velocity.

21. The invention of claim 20, wherein the assignment curve is a piecewise linear curve connecting two or more points in a two-dimensional space having data rate and velocity as its two dimensions.

22. A computer-implemented method for assigning users in an overlay network having two or more layers, comprising:
   receiving a request from a user for assignment within the network, wherein the request identifies a desired data transmission parameter for the user's assignment;
   selecting a layer of the network for the user's assignment based on the desired data transmission parameter; and
   modeling the network to determine criteria used in selecting the network layer for the user's assignment, wherein:
   the modeling is used to estimate system throughput as a function of two or more assignment curves; and
   an assignment curve that yields the highest system throughput is used to select the network layer for the user's assignment.

23. The invention of claim 22, wherein the modeling comprises using a Markov chain.

24. An assignment manager for assigning users in an overlay network having two or more layers, wherein the assignment manager:
   receives a request from a user for assignment within the network, wherein the request identifies a desired data transmission parameter for the user's assignment; and
   selects a layer of the network for the user's assignment based on the desired data transmission parameter, wherein:
   the user is a real-time-data user;
   the desired data transmission parameter is a desired data rate;
   the network layer for the user's assignment is based on the desired data rate;
   the request further comprises information about velocity of the user;
   the network layer for the user's assignment is determined based on the velocity; and
   the network layer for the user's assignment is determined by comparing the desired data rate and the velocity to an assignment curve that is dependent on both data rate and velocity.

25. The invention of claim 24, wherein the assignment curve is a piecewise linear curve connecting two or more points in a two-dimensional space having data rate and velocity as its two dimensions.

26. An assignment manager for assigning users in an overlay network having two or more layers, wherein the assignment manager:
   receives a request from a user for assignment within the network, wherein the request identifies a desired data transmission parameter for the user's assignment;
   selects a layer of the network for the user's assignment based on the desired data transmission parameter; and
   uses a model of the network to determine criteria used to determine the layer of the network for the user's assignment, wherein:

the model is used to estimate system throughput as a function of two or more assignment curves; and an assignment curve that yields the maximum system throughput is selected as the criteria used to determine the layer of the network for the user's assignment.

27. The invention of claim 26, wherein the model is a Markov chain.

28. A computer-implemented method for assigning users in an overlay network having two or more layers, comprising:

receiving a request from a user for assignment within the network, wherein the request identifies (1) a desired data transmission parameter for the user's assignment and (2) velocity of the user, wherein the velocity is independent of the desired data transmission parameter;

selecting a layer of the network for the user's assignment based on both the desired data transmission parameter and the velocity; and modeling the network to determine criteria used in selecting the network layer for the user's assignment, wherein the modeling is used to estimate system throughput as a function of two or more assignment curves, wherein an assignment curve that yields the highest system throughput is used to select the network layer for the user's assignment.

29. The invention of claim 28, wherein the modeling comprises using a Markov chain.

30. An assignment manager for assigning users in an overlay network having two or more layers, wherein the assignment manager:

receive a request from a user for assignment within the network, wherein the request identifies (1) a desired data transmission parameter for the user's assignment and (2) velocity of the user, wherein the velocity is independent of the desired data transmission parameter;

select a layer of the network for the user's assignment based on both the desired data transmission parameter and the velocity; and use a model of the network to determine criteria used to determine the layer of the network for the user's assignment, wherein the model is used to estimate system throughput as a function of two or more assignment curves, wherein an assignment curve that yields the maximum system throughput is selected as the criteria used to determine a layer of the network for the user's assignment.

31. The invention of claim 30, wherein the model is a Markov chain.

* * * * *